United States Patent
Topf et al.

(10) Patent No.: US 11,648,902 B2
(45) Date of Patent: May 16, 2023

(54) METHOD FOR MONITORING THE INTERIOR OF A VEHICLE, MONITORING ARRANGEMENT AND VEHICLE

(71) Applicant: Brose Fahrzeugteile SE & Co. Kommanditgesellschaft, Bamberg, Bamberg (DE)

(72) Inventors: Carsten Topf, Schonungen (DE); Sergej Gauerhof, Knetzgau (DE); Wolfgang Uebel, Weitramsdorf (DE); Benjamin Gruenewald, Hassfurt (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 440 days.

(21) Appl. No.: 16/829,527

(22) Filed: Mar. 25, 2020

(65) Prior Publication Data
US 2020/0307483 A1 Oct. 1, 2020

(30) Foreign Application Priority Data

Mar. 26, 2019 (DE) ...................... 10 2019 204 157.4

(51) Int. Cl.
*B60R 21/015* (2006.01)
*G07C 5/08* (2006.01)
(Continued)

(52) U.S. Cl.
CPC ........ *B60R 21/01534* (2014.10); *G01G 19/44* (2013.01); *G01S 13/42* (2013.01);
(Continued)

(58) Field of Classification Search
CPC ........ G01S 7/412; G01S 7/415; G01S 13/003; G01S 13/88; G01S 13/42; G01S 13/56;
(Continued)

(56) References Cited

U.S. PATENT DOCUMENTS 6,270,116 B1 * 8/2001 Breed ..................... B60R 22/20
180/287
6,445,988 B1 * 9/2002 Breed ............... B60R 21/01532
180/268
(Continued)

FOREIGN PATENT DOCUMENTS

CN 101865663 A * 10/2010 ............. B60N 2/002
CN 107074124 A * 8/2017 ............. B60L 53/12
(Continued)

OTHER PUBLICATIONS

M. G. Kisic, N. V. Blaz, K. B. Babkovic, L. D. Zivanov and M. S. Damnjanovic, "Detection of Seat Occupancy Using a Wireless Inductive Sensor," in IEEE Transactions on Magnetics, vol. 53, No. 4, pp. 1-4, Apr. 2017, Art No. 4001204, doi: 10.1109/TMAG.2016.2632862. (Year: 2016).*
(Continued)

*Primary Examiner* — Cuong H Nguyen
(74) *Attorney, Agent, or Firm* — Dickinson Wright PLLC

(57) ABSTRACT

A method for monitoring the interior of a vehicle including emitting electromagnetic waves of at least one frequency or at least one frequency band towards at least one seat arranged in the interior of the vehicle by means of an electromagnetic radiator, receiving reflected electromagnetic waves by means of a sensor, detecting a living object on the seat from the received reflected electromagnetic waves by means of a detection device, determining a volume of the detected object from the received reflected electromagnetic waves by means of the detection device, determining a weight characteristic of the detected object on the basis of the determined volume of the object by means of the detection device, outputting a detection signal representing the weight characteristic by way of the detection device, and
(Continued)

actuating a safety system to make the interior safe in accordance with the detection signal.

19 Claims, 2 Drawing Sheets

(51) Int. Cl.
*G01G 19/44* (2006.01)
*G01S 13/42* (2006.01)
*B60R 21/01* (2006.01)
*B60N 2/20* (2006.01)

(52) U.S. Cl.
CPC .............. *G07C 5/0816* (2013.01); *B60N 2/20* (2013.01); *B60R 2021/01225* (2013.01)

(58) Field of Classification Search
CPC .. G01G 19/4142; G01G 19/44; G07C 5/0816; B60R 21/01534; B60R 2021/01225; B60R 2021/01211; B60R 2021/01245; B60N 2/20
USPC ................................................ 701/45; 342/27
See application file for complete search history.

(56) References Cited

U.S. PATENT DOCUMENTS

| | | | | |
|---|---|---|---|---|
| 6,757,602 | B2* | 6/2004 | Breed | B60R 21/01532 180/268 |
| 7,243,945 | B2* | 7/2007 | Breed | B60N 2/853 180/274 |
| 7,766,383 | B2* | 8/2010 | Breed | B60N 2/002 280/735 |
| 7,976,060 | B2* | 7/2011 | Breed | B60R 21/01538 297/217.2 |
| 8,235,416 | B2* | 8/2012 | Breed | B60R 21/01542 340/667 |
| 9,102,220 | B2* | 8/2015 | Breed | B60N 2/2806 |
| 9,263,800 | B2* | 2/2016 | Chen | H01Q 1/526 |
| 11,127,042 | B2* | 9/2021 | Wasserman | G08G 1/096716 |
| 2006/0251293 | A1* | 11/2006 | Piirainen | B60R 21/01512 382/104 |
| 2007/0025597 | A1* | 2/2007 | Breed | B60N 2/002 382/104 |
| 2007/0086624 | A1* | 4/2007 | Breed | B60R 21/01552 382/104 |
| 2008/0147253 | A1* | 6/2008 | Breed | G01C 21/3697 701/3 |
| 2012/0001463 | A1* | 1/2012 | Breed | B60N 2/2863 297/217.2 |
| 2016/0311388 | A1* | 10/2016 | Diewald | G01S 13/04 |
| 2017/0363458 | A1* | 12/2017 | Mitani | G01N 27/22 |
| 2020/0164770 | A1* | 5/2020 | Lee | G06V 20/56 |
| 2020/0300997 | A1* | 9/2020 | Gauerhof | G01S 13/32 |

FOREIGN PATENT DOCUMENTS

| | | | |
|---|---|---|---|
| DE | 19753802 A1 | 6/1999 | |
| DE | 10059788 A1 * | 6/2002 | ............ B60N 2/433 |
| DE | 10059788 A1 | 6/2002 | |
| DE | 10254202 A1 | 6/2004 | |
| DE | 10342554 A1 | 4/2005 | |
| DE | 102015010282 A1 | 3/2016 | |
| DE | 102015215408 A1 | 2/2017 | |
| DE | 102016000769 A1 | 7/2017 | |
| EP | 1339570 A1 | 9/2003 | |
| SE | 523753 C2 * | 5/2004 | ........... B60K 28/066 |

OTHER PUBLICATIONS

R. Ke, Y. Zhuang, Z. Pu and Y. Wang, "A Smart, Efficient, and Reliable Parking Surveillance System With Edge Artificial Intelligence on IoT Devices," in IEEE Transactions on Intelligent Transportation Systems, vol. 22, No. 8, pp. 4962-4974, Aug. 2021, doi: 10.1109/TITS.2020.2984197; (Year: 2021).*

L. Wu and Y. Wang, "Stationary and Moving Occupancy Detection Using the SLEEPIR Sensor Module and Machine Learning," in IEEE Sensors Journal, vol. 21, No. 13, pp. 14701-14708, 1 Jul. 1, 2021, doi: 10.1109/JSEN.2021.3071402; (Year: 2021).*

* cited by examiner

METHOD FOR MONITORING THE INTERIOR OF A VEHICLE, MONITORING ARRANGEMENT AND VEHICLE

CROSS-REFERENCE TO RELATED APPLICATIONS

This application claims priority to German Patent Application No. sDE 10 2019 204 157.4, filed on Mar. 26, 2019, the disclosure of which is hereby incorporated in its entirety by reference herein.

TECHNICAL FIELD

The present disclosure relates to a monitoring arrangement for use in a vehicle interior and a method operating same.

BACKGROUND

In the interior, passenger transport vehicles, such as automobiles, typically have front seats for the driver and a passenger and rear seats for transporting further persons. In the driver and front passenger seats, pressure-sensitive mats are usually arranged below the seat surface so as to detect seat occupancy by a person. If it is detected that a person is sitting on the seat, for example a warning signal may be generated that notifies the person to fasten his seat belt, to close the doors or the like. The pressure-sensitive mats may further be set up to determine a weight of the person sitting on the seat, for example from a detected pressure value. This weight information can advantageously be used to set release parameters for an airbag assigned to the seat in question so as to avoid persons being harmed by the airbag.

SUMMARY

One or more objects of the present disclosure may be to provide a concept for monitoring an interior of a vehicle so that different functionalities may be efficiently implemented.

According to one embodiment, a method for monitoring a vehicle interior is provided. The method may include emitting electromagnetic waves of at least one frequency or at least one frequency band towards at least one seat arranged in the interior of the vehicle by means of an electromagnetic radiator and receiving reflected electromagnetic waves by means of a sensor. By means of the radiator, electromagnetic waves, for example microwaves or radio waves, acoustic waves such as ultrasound waves, or waves in the form of light, such as infrared radiation, may be directed towards a seat or a region in which the seat is arranged. The electromagnetic waves reflected by the seat or by an object located on the seat, or generally the electromagnetic waves reflected by a surface in the seat region, may be detected by the sensor, the sensor generating a sensor signal that may be based on the reflected electromagnetic waves or radiation, for example using an electric circuit.

In another embodiment, a living object on the seat may be detected by means of a detection device from the reflected electromagnetic waves received by the sensor. From the reflected waves, in particular a change in the frequency of the reflected waves by comparison with the electromagnetic waves emitted by the radiator or transmitter and/or a transit time of the waves from the transmitter to the surface and back to the sensor or receiver and/or a change in the transit time over time can be detected by the detection device. From one or more of these pieces of information contained in the sensor signals, the detection device can detect a living object, for example on the basis of movements of the object which results in a change in the transit time and/or a frequency shift between the emitted and reflected waves. For example, the detection device may be set up to execute corresponding recognition algorithms, for example in that a processor and a memory readable thereby are provided along with a software program in the detection device.

Further, a volume of the detected object may be determined by means of the detection device from the received reflected electromagnetic waves, a weight characteristic of the detected object may be determined on the basis of the determined volume of the object by means of the detection device, and a detection signal representing the weight characteristic may be outputted by the detection device. By way of the reflected electromagnetic waves, which are emitted for example in a planar manner towards the seat, there may be a reflection from a large number of points on the surface, and so for each point a transit length of the wave and thus a distance with respect to a reference distance, for example between the seat and the sensor, can be determined. In this way, a volume of the object can be determined. A weight characteristic may for example be determined by multiplying the volume by a predetermined density, for example a density of 1 $g/cm^3$. In this way, a weight of a living object, for example of a person, can be approximately determined. If a living object has been detected, the detection device outputs a detection signal, which represents at least the weight characteristic of the detected living object and thus indirectly also represents the volume thereof and the fact that the object is present.

In a further step, a safety system may be actuated to make the interior safe in accordance with the detection signal. In this step, various safety settings are set in the vehicle interior, specifically in such a way that the safety settings are tuned to the detected weight. The safety system may include various components or devices which are provided and set up for warning and/or protecting occupants of the vehicle against physical injury.

In one or more embodiments a monitoring arrangement for a vehicle interior is provided. The monitoring arrangement may include at least one seat for a person, an electromagnetic radiator which may be configured to emit electromagnetic waves towards the seat, a sensor which may be arranged and set up to receive electromagnetic waves which have been emitted by the radiator and reflected by a surface in the region of the seat, and a detection device connected to the sensor and the radiator. The detection device may be configured to detect a living object based on the reflected electromagnetic waves received by the sensor, to determine a weight characteristic of the detected object on the basis of the determined volume of the object, and to output a detection signal representing the weight characteristic. For example, the detection device may provide the detection signal as an electric voltage at a signal output.

The arrangement may include an actuation device, that may be connected to the detection device, for actuating a safety system for making the interior safe in accordance with the detection signal generated by the detection device. The actuation device may, for example, be a control unit for generating actuation signals, for example, in the form of electric signals, and individual devices of the safety system may be actuated based on the actuation signals. The actuation device may generate the actuation signals for actuating the safety system based on the detection signal and thus as a function of the determined weight of the detected living object. The actuation device may for example be implemented as part of the detection device or vice versa. Alternatively, the actuation and detection device may also be implemented as separate units that may be separated from one another.

In yet another embodiment, a passenger transport vehicle is provided. The passenger transport vehicle may include a monitoring arrangement, described in the present disclosure, and a safety system, that may be connected to the actuation device, to provide safety measures within the vehicle interior.

In one or more embodiments, a method of detecting a living object on a seat of a vehicle by irradiating a seat region using electromagnetic waves, is provided. The method may approximately determine the weight of the detected object and adapt settings of a safety system of the vehicle based on the determined weight of the detected living object. Thus, a contactless and therefore zero-maintenance and less error-prone weight detection may be provided so as to set safety settings in the interior. Moreover, as a result of the contactless weight detection, a greater number of seat regions, for example a driver seat and a front passenger seat, may be monitored by means of a single sensor. Different safety settings may be set individually by approximately determining the weight of an individual in each seat. Since the determining the weight permits conclusions as to a physical constitution of the detected person and also determines the forces potentially acting on the person during acceleration of the vehicle, safety settings may be set with improved precision.

One embodiment of the method may provide that the actuation of the safety system may include adjusting release parameters of an airbag assigned to the seat as a function of the determined weight. For example, release of deployment or a rate of change of volume of the airbag upon deployment can be set. If for example it is determined that the detected living object is lighter than a particular minimum weight, the deployment of the airbag may be blocked. As an example, a rate of change of volume may, for example, be set by specifying a number of ignitions of propelling charges to be performed to fill the air bag as a function of the weight, more propelling charges being ignited the greater the approximately determined weight of the person or of the detected living object. In this way, the safety of the vehicle occupants can be improved.

In yet another embodiment, the seat may be movable between a first position and a second position, so that as a backrest of the seat is pivoted towards a seat surface of the seat, the actuation of the safety system may include releasing a locking mechanism, that may lock the seat in the first position, when the determined weight and/or the determined volume of the detected object is less than a predetermined threshold. Accordingly, it may be determined whether the living object is smaller or lighter than a predetermined threshold for volume and/or weight, and only if this is the case is the folding of the seat, which may for example take place automatically via a drive device, released by the locking mechanism. For example, actuation of the locking mechanism may be implemented by a circuit, that may be switched by the detection signal or by an actuation command generated by the actuation device and may block movability of the drive device.

In one or more embodiments the emitted electromagnetic waves in the interior of the vehicle may be emitted towards a driver seat and towards at least one further seat, for example, a rear seat region that may include at least one rear seat. Living objects disposed on the front seat and in the rear seat region may be detected from the received reflected electromagnetic waves, the detection device outputting a first detection signal if a living object is detected on the driver seat, and outputting a second detection signal if a living object is detected on the other seat(s). Accordingly, one and the same sensor may detect the occupancy of both the driver seat or front seat and of one or more of the rear seats. In this way, particularly efficient monitoring of the interior may be implemented using a low number of components. The detection signals each represent the weight characteristic and the presence of a living object located on the associated seat.

Optionally, the actuation of the safety system may include generating a warning signal when a first detection signal is interrupted and the second detection signal is still generated. Thus, if for example a first living object is detected on the driver seat and a second living object is detected on one of the rear seats or the front passenger seat, the first and the second detection signal may be generated. If it is for example detected that the first living object has left the driver seat, in that absence of the first detection signal is established, but simultaneously detected that a living object is still present in the rear seat region or on the front passenger seat, a warning signal may generated. The warning signal may be for example, an acoustic, visual or haptic signal, that may be generated by a warning device of the safety system. The actuation device may for example cause the warning device to generate the warning signal when the first detection signal is absent.

Optionally, the warning signal may only be generated if one or more of the following conditions are additionally met:

a) the living object detected on another seat and the living object has a volume less than a predetermined maximum volume and greater than a predetermined minimum volume;

b) the living object on another seat is detected after the first detection signal has been interrupted for a timespan that lasts longer than a predetermined maximum timespan;

c) it is detected that an air-conditioning system for air-conditioning the interior is in an off state;

d) it is detected that an external temperature is greater than a predetermined threshold;

e) it is detected that a suppression condition for suppressing the warning signal has not been met.

As is specified by condition a), a warning signal may for example only be generated for particular object sizes or weights. This advantageous to reliably distinguish living objects that require protection, such as children or small animals, from adults. Condition b) may prevent the warning signal from being generated immediately when a driver leaves the driver seat, even though a living object is still detected on the rear seat. This may improve the comfort of the warning function, because the driver may be given time to check the rear seat region or to help a child get out. Conditions c) and d) prevent the warning signal from being generated under conditions which are not of concern for living objects located on the rear seat, for example if an air-conditioning system of the vehicle is operating in an error-free manner and thus keeping the internal temperature in the vehicle in a predetermined range, for example between 19° C. and 25° C., or an external temperature is low in any case, for example less than 20° C. A suppression condition as mentioned in point e) may for example be met if a switch which deactivates the warning device is actuated or if the driver, who is sitting on the driver seat, performs a particular movement which is detected by the sensor and detected by the detection device by way of the sensor signals.

In one or more embodiments, the method may include a sensor that is an imaging radar sensor. In this case, the electromagnetic waves emitted by the radiator may be directed pointwise towards a plurality of points. The electromagnetic waves may be reflected by the plurality of points and may be received by the sensor in a temporally resolved manner. For each of the points a distance of the point in question from the sensor and an angle relative to a directional axis of the sensor may be determined by the detection device. This may facilitate determining the volume of the detected living object, and may improve the precision of the detection.

As an example, the frequency of the emitted electromagnetic waves may be modulated, for example in a range between 77 GHz and 81 GHz. The frequency may be modulated in such a way that it rises linearly, such as in discrete steps, and at a particular value abruptly falls back to the initial value again (sawtooth pattern), or in such a way that it alternately rises and falls with a constant rate of change. As a result of the modulation of the electromagnetic waves during steady emission of the waves, the differential speed between the sensor and the irradiated surface and their absolute distance from one another may be determined simultaneously.

In another embodiment, the radiator may include a radar transmitter for emitting radio waves or microwaves, and the sensor may be configured to receive the radio waves or microwaves.

As another example, the sensor may be an imaging radar sensor. The radiator may be configured for pointwise emission of the electromagnetic waves onto a plurality of points, and the sensor may be configured for receiving, in a temporally resolved manner, the electromagnetic waves reflected from the large number of points. In this case, the detection device may set, for each of the points, a distance of the point in question from the sensor and an angle relative to a directional axis of the sensor.

In one or more embodiments, the monitoring arrangement may include a front seat and a rear seat region, arranged behind the front seat and may include at least one rear seat. The sensor and the radiator may be arranged in the region of the front seat in such a way that both the front seat and the rear seat region are in a field of view of the sensor device. Thus, both the radiator and the sensor may be oriented facing the seats, and the front seat and the rear seat region may be positioned in succession within the field of view of the sensor. For example, the sensor may be positioned above the front seat and the rear seat region simultaneously, in such a way that the front seat and the rear seat region can be monitored simultaneously using one sensor.

As an example, the sensor and the radiator may each have a field of view configured for emitting and receiving detection radiation having an opening angle in azimuth and/or elevation in a range between 150 degrees and 200 degrees or between 175 degrees and 185 degrees. In this way, a wide field of view of the sensor may be implemented, and may make it possible to position the sensor flexibly to monitor a large region. This may provide efficient and flexible monitoring of the interior of the vehicle possible.

In one or more embodiments, the safety system may include one or more of the following devices:

a) an airbag, which is assigned to an associated seat;

b) a locking mechanism, which locks a seat in a first position, the seat being movable between a first position and a second position, in which a backrest of the seat is pivoted towards a seat surface of the seat;

c) a warning device for generating a warning signal.

The above configurations and developments may be combined with one another as desired, within reason. Further possible configurations, developments and implementations of the invention comprise combinations, including those not explicitly mentioned, of features of the invention which are described above or in the following in relation to the embodiments. In particular, a person skilled in the art will also add individual aspects, as improvements or supplements, to each basic form of the present invention.

BRIEF DESCRIPTION OF THE DRAWINGS

In the following, the present invention is described in greater detail with reference to the embodiments specified in the schematic drawings, in which.

Figure 1:
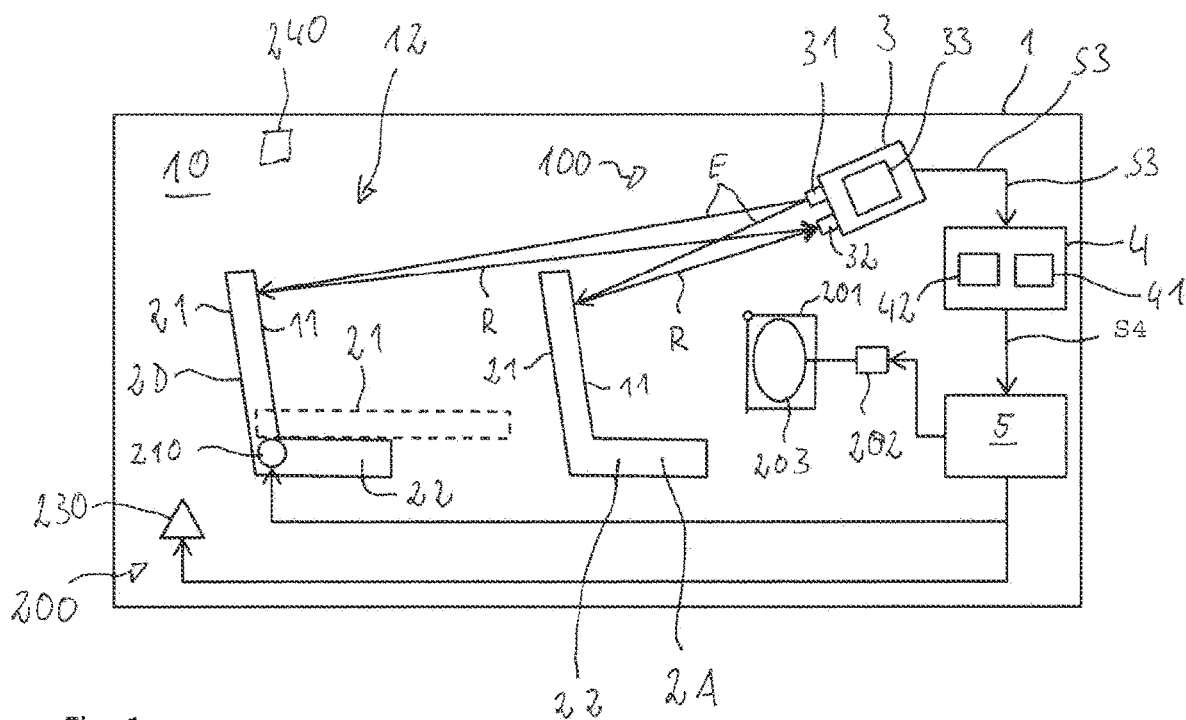
FIG. 1 is a schematic functional view of an interior of a vehicle comprising a monitoring arrangement in accordance with an embodiment of the present disclosure.

The accompanying drawings are intended to impart further understanding of the embodiments of the invention. They illustrate embodiments and serve, in connection with the description, to explain principles and concepts of the invention. Other embodiments and many of the stated advantages can be derived from the drawings. The elements of the drawings are not necessarily shown to scale with one another.

In the drawings, like, functionally equivalent and equivalently operating elements features and components are provided with like reference numerals in each case unless otherwise specified.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

US 2016/0311388 A1 describes a use of radar sensors to detect seat occupancy in a vehicle, so as to avoid problems associated with the use of mats, such as damage to the wiring of the mats as a result of adjusting the seats. By way of the described radar sensors, a size of a person who is sitting on a seat in the vehicle interior can be determined.

FIG. 1 shows a vehicle 1 purely schematically, by way of example, as a rectangular block. The vehicle 1 may be a car or transporter or generally a passenger transport vehicle. The vehicle 1 has a monitoring arrangement 100 comprising at least one seat 2A-2E, which is arranged in an interior 10 of the vehicle 1. The monitoring arrangement 100 may include a radiator 31 for emitting electromagnetic waves E, a sensor 32 for receiving or detecting reflected electromagnetic waves R, a detection device 4, and an actuation device 5. The vehicle 1 further has a safety system 200.

Figure 2:
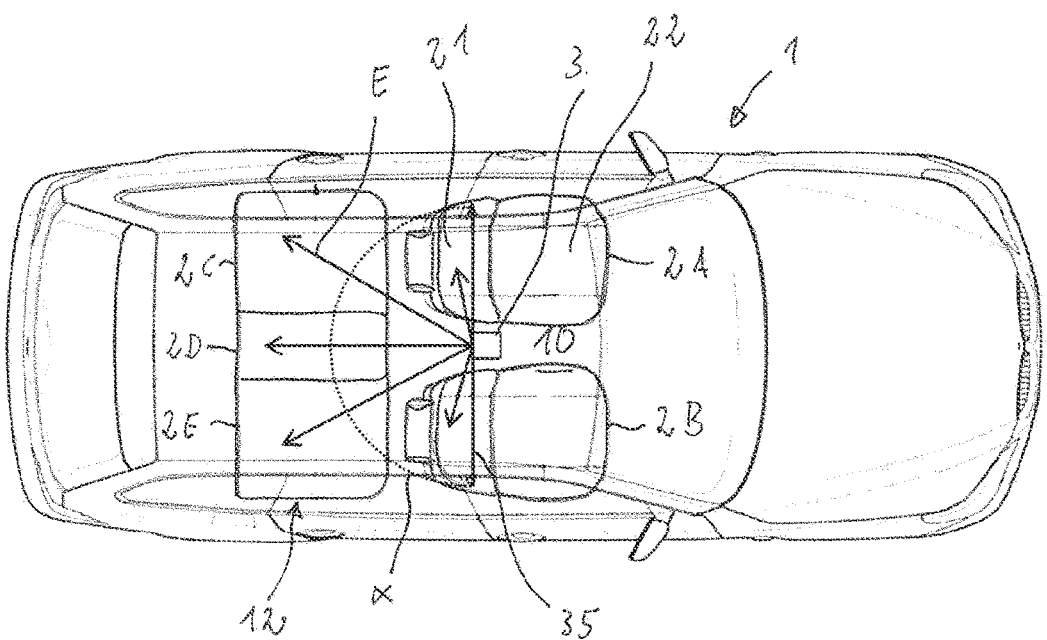
FIG. 2 is a schematic plan view of an interior of a vehicle comprising a monitoring arrangement in accordance with a further embodiment of the present disclosure.

FIG. 2 is a plan view, by way of example, of an interior 10 of a vehicle 1, in which the monitoring arrangement 100 can be provided. As can be seen in FIG. 2, for example a driver seat 2A and a front passenger seat 2B may be provided as front seats, and a rear seat region 12 may be provided, arranged behind the front seats in terms of a vehicle longitudinal axis and comprising three rear seats 2C, 2D, 2E arranged side by side.

As is schematically shown in FIG. 1, the radiator or transmitter 31 and the sensor or receiver 32 may be combined to form a sensor device 3. Further, an evaluation unit 33 for generating sensor signals S3 may be assigned to the sensor 32, or the sensor 31 may include the unit, for example in the form of an analogue circuit.

The radiator 31 is set up to emit electromagnetic waves of at least one frequency or at least one frequency band, and serves to emit electromagnetic waves E towards the at least one seat 2. The radiator 31 may have a radar transmitter for emitting radio waves or microwaves. The radiator 31 may itself be set up to generate electromagnetic waves.

The sensor 32 is set up to receive reflected electromagnetic waves R which have been emitted by the radiator 31 and reflected on a surface 11. By way of example, the sensor 32 may be set up to receive radio waves or microwaves.

As can be seen in FIGS. 1 to 4, the sensor device 3 or in general the radiator 31 and sensor 31 may be arranged in the region of the front seat 2A, 2B in such a way that both the front seat 2A, 2B and the rear seat region 12 are in a field of view 35 of the radiator 31 and sensor 32. As is shown schematically in FIG. 2, the sensor device 3 may for example be arranged in the region of the backrest 21 of the front seats 2A, 2B, between them, on a vehicle ceiling. The sensor 32 and the radiator 31 may each have a field of view 35 for emitting and receiving detection radiation having an opening angle α in azimuth in a range between 150 degrees and 200 degrees, such as between 175 degrees and 185 degrees. FIG. 2 shows by way of example a field of view 35 having an opening angle α in azimuth of approximately 180 degrees. The field of view may also have an opening angle in the region of 180 degrees in elevation.

As is schematically shown in FIG. 1, the waves E emitted by the radiator 31 are directed onto one surface 11, in FIG. 1 for example a surface of the seat 2A, 2D in question. This surface 11 reflects at least some of the emitted waves E as reflected radiation or reflected electromagnetic waves R, which are detected by the sensor 32. By way of example and for reasons of clarity, FIG. 1 only shows irradiation of a small, discrete region of the surface 11. However, electromagnetic waves are directed or emitted onto each of a seat surface region 2b and a surface 2a of a backrest of the seat 2. Optionally, the sensor 32 is formed as an imaging radar sensor. For example, by means of the radiator 31, the electromagnetic waves E are directed onto a plurality of points in the region of the seats 2A-2E in succession, for example via different antennae, the sensor 31 receiving the waves R reflected from the associated points in succession, in such a way that the evaluation unit 33 generates a temporally resolved signal S3, from which, for each of the points, a distance of the point in question from the sensor 32 and an angle relative to a fixed or predetermined directional axis of the sensor 32 can be determined, for example using the detection device 4 which is described in greater detail in the following.

By means of the evaluation unit 33 of the sensor 31, a sensor signal S3 is generated from the received waves R. The sensor signal S3 may for example represent a transit time or transit length which the waves E, R require for the path from the radiator 31 to the surface 11 and back to the receiver 32 and/or a frequency of the reflected waves R and optionally of the emitted waves E. As described previously above, an angle of each point from which the wave E is returned as a reflected wave R relative to the directional axis of the sensor 32 may also be represented by the sensor signal S3. Thus, a distance dl between the surface 11 and the sensor device 3 or sensor 32, and optionally a differential speed, such as a change in the distance dl, may be determined from the sensor signal S3. The evaluation unit 33 is connected to the sensor 32 and optionally also to the radiator 31.

The detection device 4 is set up to process the sensor signals S3, and connected for this purpose to the sensor device 3 or to the radiator 31 and sensor 32, for example via the evaluation unit 33 by means of a wired or wireless communications interface (not shown). As is schematically shown in FIG. 1, the detection device 4 may be configured for digital data processing and have a processor 41, such as a CPU, and a data memory 41, a non-volatile data memory, such as a flash memory or a hard disk. Further, the processing device 4 may also have an analogue-digital converter (not shown) so as to convert the received sensor signals S3 into digital signals if the sensor signals S3 are provided by the evaluation unit 33 as analogue signals. Further, the detection device 4 is also set up to generate and output detection signals S4 or generally to generate and output electrical signals.

Figure 3:
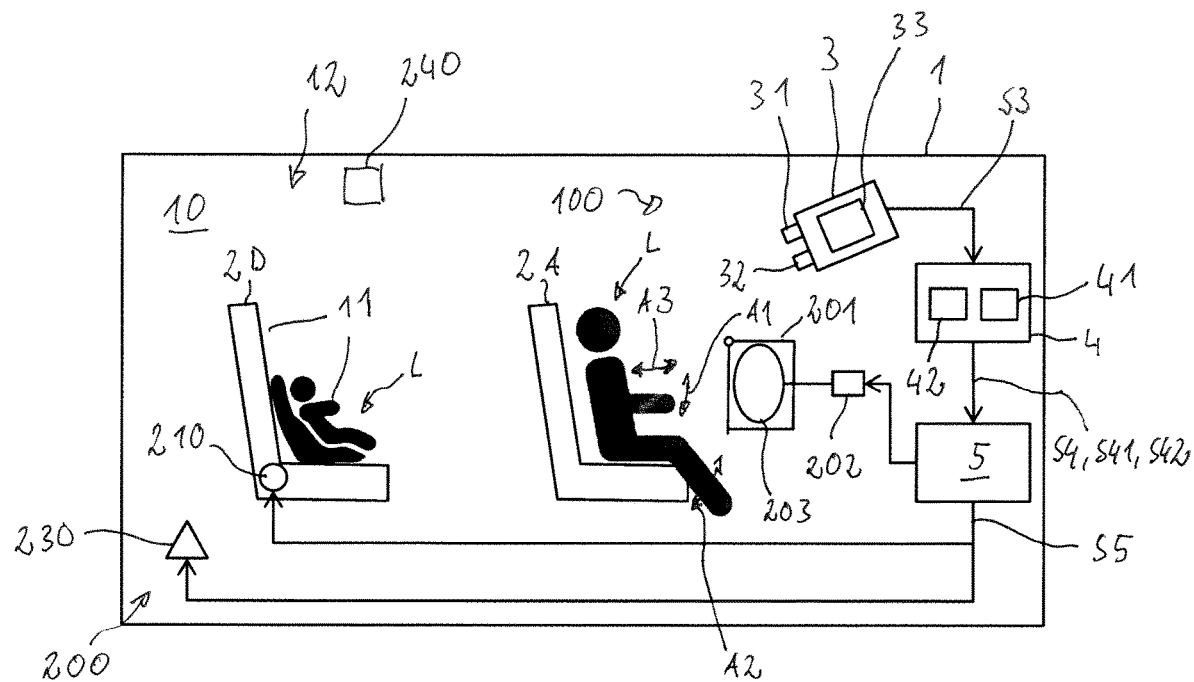
FIG. 3 shows the vehicle of FIG. 1 when a method according to an embodiment of the present disclosure is being carried out, a living object being present on a driver seat and a rear seat.
Figure 4:
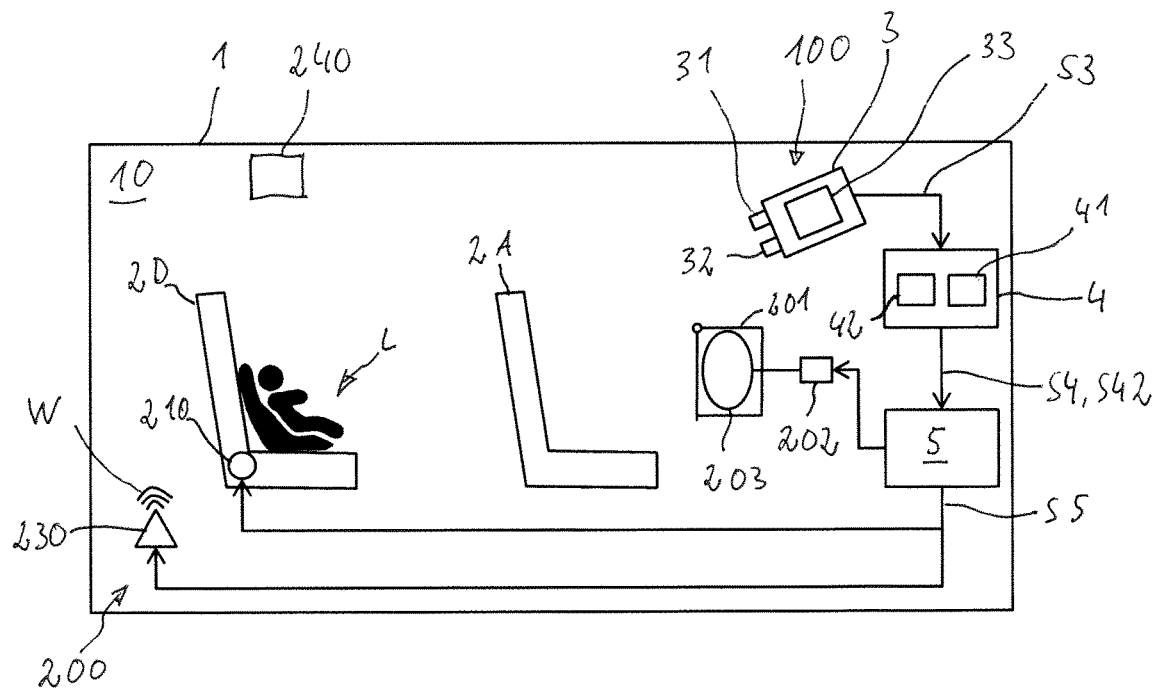
FIG. 4 shows the vehicle of FIG. 1 when a method according to an embodiment of the present disclosure is being carried out, a living object only being present on a rear seat.

The actuation device 5 is likewise set up to generate and output electrical signals, and may for example be implemented separately from the detection device 4, in other words with a separate processor and memory (both not shown), as is shown in FIGS. 1, 3 and 4 by way of example. Alternatively, the actuation device 5 and detection device 4 may also be combined jointly in a control unit, it being possible for the functions of the actuation device 5 and of the detection device 4 each to be performed by the same processor or by different processors. In general, the actuation device 5 and detection device 4 are interconnected for data exchange.

The safety system 200 of the vehicle 1 may include different devices 201, 210, 230, 240, which are set up to warn and/or protect occupants of the vehicle against physical harm. In the vehicle 1 shown by way of example in FIG. 1, the safety system 200 may include an airbag 201, which is assigned to one of the front seats 2A, 2D, a locking mechanism 210, which locks a seat 2A-2E in a first position, and a warning device 230 for generating a warning signal W.

The airbag 201 may be implemented in a known manner. For example, the airbag 201 may include a gas generator 202 for filling a cushion 203 with gas, a fill rate or volume flow rate of gas, at which the cushion 203 is filled, being settable by way of the gas generator 202.

The locking mechanism 210 serves to lock the seat 2A-2E in the upright position. A seat 2A-2E may for example be movable between a first position and a second position, in which a backrest 21 of the seat 2A-2E is pivoted towards a seat surface 22 of the seat. FIG. 1 schematically shows the first or upright position of the seat 2D in solid lines and the second position of the seat 2D in dashed lines. The locking mechanism 210 may for example be implemented mechanically or in circuitry, for example using a circuit by means of which an electric motor for moving the seat 2A-2D between the first and second position can be activated or deactivated.

The warning device 230 serves to generate an optical, acoustic or haptic warning signal W, and may for example be implemented using signal lights, internal lighting of the vehicle or external lighting of the vehicle, using a vibration generator integrated into a key of the vehicle, using a loudspeaker, or in some similar manner.

Optionally, an air-conditioning device 240, merely shown symbolically as a block in FIGS. 1, 3 and 4, may be part of the safety system 200 of the vehicle 1. The air-conditioning device 240 air-conditions the interior 10 of the vehicle 1 in an operating state, such as by supplying temperature-controlled air into the interior 10.

The individual devices 201, 210, 230, 240 of the safety system 200 are each connected to the actuation device 5 and actuable or controllable by the actuation device 5. For example, the actuation device 5 may generate an actuation signal S5 so as to cause the warning device 230 to generate a warning signal W, as is shown symbolically in FIG. 4. Further, by way of the actuation signal S5, a volume flow rate generable by the gas generator 202 can also be controlled. Also, by way of the actuation signal S5, the locking mechanism 210 can be released, in such a way that it permits pivoting of the seat 2A-2E between the first and the second position. Optionally, the air-conditioning device 240 may also be shifted from an off state into the operating state by way of the actuation signal S5.

The monitoring arrangement 100, along with the radiator 31, sensor 32, detection device 4 and actuation device 5, is set up to carry out a method for monitoring an interior 10 of a vehicle 1. The detection device 4 may for example store, in the data memory 42, a software program which causes the processor 41 to carry out the steps of the method, for example to generate electrical signals to control the radiator 31 and sensor 32. In the following, the method is explained by way of example with reference to the vehicle 1 described in the above.

In a first step of the method, the radiator 31 emits electromagnetic waves E of at least one frequency or at least one frequency band towards at least one of the seats 2A-2E arranged in the interior 10. As an example, electromagnetic waves E may be emitted towards all seats 2A-2E, for example in temporal succession via a plurality of antennae (not shown). Optionally, the frequency of the emitted electromagnetic waves E is modulated, for example in a range between 77 GHz and 81 GHz. The electromagnetic waves R reflected on a surface 11 are received by the sensor 32, and the sensor signal S3, generated for example by means of the evaluation unit 33 from the received reflected waves R, is passed on to the detection device 4.

If no object is located on the seats 2A-2E, the waves E emitted by the radiator 31 are reflected on the seats 2A-2E, as is shown schematically by way of example in FIG. 1. In this case, the detection device 4 detects that no objects are located on the seats 2A-2E, for example by determining, from the sensor signals S3, a transit time of the emitted wave E to the respective seat 2A-2E and back therefrom to the sensor 32 and comparing this with a reference value.

In the situation shown purely schematically by way of example in FIG. 3, a person is located on the driver seat 2A and a child is located in a child seat on the rear seat 2D. In this case, the waves E emitted by the radiator 31 are reflected on the person on the driver seat 2A and the child on the rear seat 2D. From the reflected waves R received from the sensor 31 or the sensor signal S3 generated therefrom, the detection device 4 detects living objects L on the seat 2A, 2D in question. This may for example take place on the basis of a comparison of the transit time of the waves E, R with the reference transit time. Further, the position of the objects L, in other words the person on the driver seat 2A and the child on the rear seat 2D, can be determined, for example via the reflected waves R from angle information contained in the sensor signals S3. If the presence of an object L has been detected, the detection device 4 detects movements A1, A2, A3 of the object L from the sensor signals S3. This may for example comprise determining a relative speed between the sensor 32 and the object L. For this purpose, the detection device 4 may apply conventional signal processing algorithms to the sensor signals S3. For example, a frequency shift between the emitted waves E and the reflected waves R can be detected by the detection device 4 to determine the relative speed.

As is shown by way of example in FIG. 3, a person or in general a living being performs particular movements A1, A2, A3. For example, a person regularly moves his arms, as symbolised by arrow A1 in FIG. 3, his legs, as symbolised by arrow A2 in FIG. 3, or his head. Further, in mammals and persons, the ribcage moves as a result of breathing, as is indicated by arrow A3 in FIG. 3. An object in the form of an item is typically stationary or only moves in the form of vibrations, which are transmitted to the object via the vehicle 1. Thus, the detection device 4 can determine from the detected movements A1, A2, A3 of the object whether the detected object is a living object.

In a further method step, a volume of the detected object L is determined by means of the detection device 4 from the received reflected electromagnetic waves R. This may for example take place on the basis of a pointwise evaluation of the transit time of the waves E, R. The transit time can be converted into a distance between the sensor 32 and the surface 11 on which the waves E were reflected. The seat 2A-2E in question forms a reference surface or serves as a reference distance. If an object L is positioned on the seat 2A-2E, the waves are reflected on a surface, which is arranged at a smaller distance than the reference surface from the sensor 32. In this way, for a plurality of points, a volume of the detected object L can be determined from a difference between the actual distance and the reference distance.

In a further step, the detection device determines a weight characteristic of the detected object L on the basis of the determined volume of the object L. For example, the determined volume can be multiplied by a predetermined density, for example by a density of 1 g/cm$^3$, and from this a weight characteristic approximately specifying the weight of the object L can be determined. The predetermined density of 1 g/cm$^3$ approximately corresponds to a density of the human body.

After the weight characteristic has been determined, the detection device 4 outputs a detection signal S4 representing the weight characteristic. In the situation shown by way of example in FIG. 3, the detection device 4 outputs a first detection signal S41 if a living object L is detected on the driver seat 2A, the first detection signal S41 representing the weight characteristic of the object L located on the driver seat 2A. The detection device 4 further outputs a second detection signal S42 if a living object L is detected in the rear seat region 12 or on the front passenger seat 2B, in other words in general on one of the further seats 2A-2E, such as the child located on the rear seat 2D in FIG. 3. In this example, the second detection signal S42 represents the weight characteristic of the object L located on the rear seat 2D.

The actuation device 5 acquires the detection signal S4 or the signals S41, S42 and actuates the safety system 200 in accordance with the detection signal S4. The actuation of the safety system 200 may include adjusting the release parameters of the airbag 201 as a function of the determined weight. For example, the actuation device 5 generates an actuation signal S5, which sets the settings of the gas generator 202 of the airbag 201 in such a way that, if the airbag is released, the generator provides a predetermined volume flow rate, which is stored for example in a look-up table for the weight characteristic in question.

The actuation of the safety system 200 may also comprise releasing the locking mechanism 210 locking the seat 2A-2E in question in the first position if the determined weight and/or the determined volume of the detected object L is less than a predetermined threshold. In other words, the locking mechanism 210 is not released if a living object L has been detected on the seat 2A-2E in question. However, if an object located on the seat 2A-2E in question has been detected as a living object and the weight characteristic thereof corresponds for example to a weight of less than 100 g, it can be assumed that this constitutes erroneous detection. In this case, the locking mechanism can still be released.

FIG. 4 shows by way of example that the person located on the driver seat 2A in FIG. 3 has left the driver seat 2A. In this case, the detection device 4 only continues to detect the child on the rear seat 2D as a living object L, resulting in only the second detection signal S42 still being outputted and the first detection signal S41 no longer being outputted. In this case, it may be provided that the actuation of the safety system 200 may include generating a warning signal W. For example, when the second detection S42 is being outputted, the actuation device 5 generates an actuation signal S5 if the first detection signal S41 is interrupted, the actuation signal S5 causing the warning device 230 to generate a warning signal W, for example a whistling sound. In general, the actuation of the safety system 200 can thus comprise generating a warning signal W if the first detection signal S41 is interrupted and the second detection signal S42 is still being outputted.

Optionally, the generation of the warning signal W or the generation of the corresponding actuation signal S5 by the actuation device 5 may be linked to further conditions. As an example, a further condition may be that the living object L detected on one of the further seats 2B-2E, for example in the rear seat region 12, has a volume less than a predetermined maximum volume and greater than a predetermined minimum volume. This can for example be determined by the detection device 4 as described above, it being possible for the corresponding information to be transmitted to the actuation device 5 by way of the detection signal S4. This condition prevents the warning signal W from being generated for example if adult persons are sitting in the rear seat region 12 or on the front passenger seat 2B.

A further possible condition for generating the warning signal W is that the living object L detected on the further seat 2B-2E, for example in the rear seat region 12, is being detected after interruption of the first detection signal S41 for a time period which lasts longer than a predetermined maximum time period, for example in a range between 3 seconds and 30 seconds. In other words, in FIG. 4, a warning signal W is not generated immediately once the person has left the driver seat 2A, but only after a predetermined time period has passed.

Further, it may be provided as a condition that it is detected that the air-conditioning device 240 for air-conditioning the interior 10 is in an off state. The air-conditioning device 240 may supply the operating state thereof for example to the actuation device 5 as an input signal. If the signal device 5 then acquires the second detection signal S42 and establishes an interruption to the first detection signal S41, and the air-conditioning device 240 is in an operating state 240, the generation of the warning signal W can be suppressed.

Further, the warning signal W may for example only be generated if it is detected, for example by means of a temperature sensor (not shown), that an external temperature is greater than a predetermined threshold, and/or if it is detected that a suppression condition for suppressing the warning signal has not been met. As a suppression condition, it may for example be provided that, before leaving the seat 2A, 2B, the person on the front seat 2A, 2B actuates a switch, of which the switching state is detected for example by the actuation device 5, in the interior 10 of the vehicle 1. By way of the switch, a signal may for example be generated which suppresses the generation of an actuation signal S5 by the actuation device 5 which actuates the warning device 230.

Although the present invention has been fully described by way of preferred embodiments in the above, it is not limited thereto, but rather can be modified in a variety of ways.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 Vehicle
2 Seat
3 Sensor device
4 Detection device
5 Actuation device
10 Interior
11 Surface
12 Rear seat region
21 Backrest
22 Seat surface
31 Radiator
32 Sensor
33 Evaluation unit
35 Field of view
41 Processor
42 Data memory
100 Detection arrangement
200 Safety system
201 Airbag
202 Gas generator
203 Cushion
210 Locking mechanism
230 Warning device
240 Air-conditioning device
A1-A3 Movements
α Opening angle
L Living object
E Emitted electromagnetic waves
S3 Sensor signals
S4 Detection signal
S5 Actuation signal
S41 First detection signal S42 Second detection signal
R Reflected electromagnetic waves
W Warning signal While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of monitoring an interior of a vehicle, the method comprising:
    emitting electromagnetic waves, by means of an electromagnetic radiator, having at least one frequency or within at least one frequency band towards a seat arranged in the interior of the vehicle;
    receiving, by means of a sensor, reflected electromagnetic waves;
    detecting, by means of a detection device, a living object disposed on the seat based on the reflected electromagnetic waves;
    determining, by means of the detection device, a volume of the living object based on the reflected electromagnetic waves;
    determining, by means of the detection device, a weight characteristic of the living object based on the volume of the living object determined by means of the detection device;
    outputting a detection signal, by the detection device, indicative of the weight characteristic; and
    actuating a safety system to set a number of safety settings within the interior based on the detection signal.

2. The method of claim 1, wherein the actuating the safety system step includes adjusting release parameters of an airbag assigned to the seat based at least partially on the weight characteristic.

3. The method of claim 1, wherein the seat is movable between a first position and a second position so that a backrest of the seat pivots towards a seat surface of the seat, wherein the actuating the safety system step includes releasing a locking mechanism configured to lock the seat in the first position, in response to the weight characteristic and/or the volume of the living object being less than a predetermined threshold.

4. The method of claim 1, wherein the seat is a driver seat, wherein the emitting step includes emitting the electromagnetic waves towards a rear seat disposed in a rear seat region of the interior, or a passenger seat, or a second living object disposed on either the rear seat or the passenger seat,
    wherein the detecting the living object step includes detecting the second living object based on the received reflected electromagnetic waves,
    wherein the outputting step includes outputting a first detection signal in response to detecting the living object disposed on the driver seat, and outputting a second detection signal in response to detecting the second living object disposed on either the rear seat or the passenger seat.

5. The method of claim 4, further comprising generating a warning signal in response to interruption of the first detection signal and outputting the second detection signal.

6. The method of claim 5, wherein the generating the warning signal step includes generating the warning signal in response to,
    the second living object having a detected volume less than a predetermined-maximum-volume threshold and greater than a predetermined-minimum-volume threshold, or
    detecting the second living object after interruption of the first detection signal for a timespan greater than a predetermined maximum timespan, or
    detecting a suppression condition, configured to suppress the warning signal, has not been met.

7. The method of claim 1, wherein the emitting step includes modulating a frequency of the electromagnetic waves between 77 GHz and 81 GHz.

8. A monitoring arrangement for use in an interior of a vehicle, the monitoring arrangement comprising:
    a seat configured to support a person;
    a radiator configured to emit electromagnetic waves towards the seat;
    a sensor configured to receive reflected electromagnetic waves emitted by the radiator and reflected from a surface disposed in a region surrounding the seat;
    a detection device, connected to the sensor and the radiator, and configured to, responsive to receiving signals, from the sensor, based on the reflected electromagnetic waves, detect a living object disposed on the seat and determine a volume of the living object,
    wherein the detection device is further configured to, responsive to determining the volume of the living object, determine a weight characteristic of the detected object, and output a detection signal indicative of the weight characteristic; and
    an actuation device configured to, responsive to receiving the detection signal from the detection device, actuate a safety system to adjust a number of safety settings based on the detection signal.

9. The monitoring arrangement of claim 8, wherein the radiator includes a radar transmitter configured to emit radio waves or microwaves, and wherein the sensor is configured to receive radio waves or microwaves.

10. The monitoring arrangement of claim 9, wherein the sensor is an imaging radar sensor.

11. The monitoring arrangement of claim 10, wherein the seat is a front seat and the interior of the vehicle includes a front seat region that includes the front seat, a rear seat region arranged behind the front seat and including a rear seat, wherein the sensor and the radiator are each arranged in the front seat region so that both the front seat region and the rear seat region are each disposed within a field of view of the radiator and sensor.

12. The monitoring arrangement of claim 9, wherein the sensor and the radiator each have a field of view, wherein the electromagnetic waves and the reflected electromagnetic waves are emitted and received, respectively within the field of view and for emitting and receiving detection radiation having an azimuth opening angle and/or an elevation opening angle that is greater than or equal to 180 degrees.

13. A method of monitoring an interior of a vehicle, the method comprising:
    emitting electromagnetic waves, by means of an electromagnetic radiator, having at least one frequency or within at least one frequency band towards a seat arranged in the interior of the vehicle;
    receiving, by means of a sensor, reflected electromagnetic waves;
    detecting, by means of a detection device, a living object disposed on the seat based on the reflected electromagnetic waves;

determining, by means of the detection device, a volume of the living object based on the reflected electromagnetic waves;

determining, by means of the detection device, a weight characteristic of the living object based on the volume of the living object determined by means of the detection device by multiplying the volume of the living object by a predetermined density;

outputting a detection signal, by the detection device, indicative of the weight characteristic; and actuating a safety system to set a number of safety settings within the interior based on the detection signal.

14. A monitoring arrangement for use in an interior of a vehicle, the monitoring arrangement comprising:

a seat configured to support a person;

a radiator configured to emit electromagnetic waves towards the seat;

a sensor configured to receive reflected electromagnetic waves emitted by the radiator and reflected from a surface disposed in a region surrounding the seat;

a detection device, connected to the sensor and the radiator, and configured to, responsive to receiving signals, from the sensor, based on the reflected electromagnetic waves, detect a living object disposed on the seat and determine a volume of the living object, wherein the detection device is further configured to, responsive to determining the volume of the living object, determine a weight characteristic of the detected object by multiplying the volume of the living object by a predetermined density, and output a detection signal indicative of the weight characteristic; and an actuation device configured to, responsive to receiving the detection signal from the detection device, actuate a safety system to adjust a number of safety settings based on the detection signal.

15. The monitoring arrangement of claim 14, wherein the safety system includes an airbag configured to deploy to protect the living object disposed on the seat, wherein the actuation system is configured to, responsive to the detection signal being indicative of the weight characteristic being less than a predetermined weight threshold, decrease a volume of the airbag when the airbag is deployed.

16. The monitoring arrangement of claim 15, wherein the predetermined weight threshold is 100 grams.

17. The method of claim 6, wherein the first detection signal is interrupted in response to an absence of the living object within the interior of the vehicle.

18. The method of claim 17, wherein the generating the warning signal step includes generating the warning signal in response to detecting an external temperature being greater than a predetermined temperature threshold.

19. The method of claim 17, wherein the generating the warning signal step includes generating the warning signal in response to detecting an air-conditioning system being in an off state.

* * * * *